United States Patent
Alperin et al.

(10) Patent No.: US 10,063,111 B2
(45) Date of Patent: Aug. 28, 2018

(54) METHOD AND SYSTEM FOR MANAGING WIRELESS POWER TRANSFER FOR ELECTRICAL DEVICES

(71) Applicants: POWERMAT TECHNOLOGIES LTD., Neve Ilan (IL); Eduardo Alperin, Raanana (IL); Aya Kantor, Tel Aviv (IL); Ian Podkamien, Petach Tikva (IL)

(72) Inventors: Eduardo Alperin, Raanana (IL); Aya Kantor, Tel Aviv (IL); Ian Podkamien, Petach Tikva (IL)

(73) Assignee: POWERMAT TECHNOLOGIES LTD., Neve Ilan (IL)

( * ) Notice: Subject to any disclaimer, the term of this patent is extended or adjusted under 35 U.S.C. 154(b) by 266 days.

(21) Appl. No.: 15/108,965

(22) PCT Filed: Jan. 1, 2015

(86) PCT No.: PCT/IL2015/050008
§ 371 (c)(1),
(2) Date: Jun. 29, 2016

(87) PCT Pub. No.: WO2015/101997
PCT Pub. Date: Jul. 9, 2015

(65) Prior Publication Data
US 2016/0336815 A1 Nov. 17, 2016

Related U.S. Application Data

(60) Provisional application No. 61/922,813, filed on Jan. 1, 2014.

(51) Int. Cl.
*H01F 27/42* (2006.01)
*H01F 37/00* (2006.01)
(Continued)

(52) U.S. Cl.
CPC .............. *H02J 50/80* (2016.02); *H02J 7/025* (2013.01); *H02J 50/10* (2016.02); *H02J 50/12* (2016.02);
(Continued)

(58) Field of Classification Search
USPC .......................................................... 307/104
See application file for complete search history.

(56) References Cited

U.S. PATENT DOCUMENTS 9,088,168 B2 7/2015 Mach et al.
9,867,062 B1 * 1/2018 Bell ...................... H04W 24/02
(Continued)

FOREIGN PATENT DOCUMENTS

WO 2013102908 A1 7/2013

*Primary Examiner* — Adam Houston
(74) *Attorney, Agent, or Firm* — William Dippert; Laurence Greenberg; Werner Stemer

(57) ABSTRACT

The disclosure relates to systems and methods for managing wireless power transfer network for communication devices, providing central management in communication with a cloud based network for enabling remote activation. The system comprising at least one wireless power outlet and at least one management server. The management system, of the current disclosure, is enabling possible remote activation and associate between a communication device and a wireless power receiver, thus, allowing power transfer between the remote health check and maintenance of all of wireless power outlets from an outlet to a communication device via an associated wireless power receiver as well as providing communication based upon its UDID associated with the relevant RXID.

17 Claims, 9 Drawing Sheets

(51) Int. Cl.
  *H01F 38/00* (2006.01)
  *H02J 50/80* (2016.01)
  *H02J 7/02* (2016.01)
  *H02J 50/10* (2016.01)
  *H04B 5/00* (2006.01)
  *H02J 50/12* (2016.01)
  *H02J 50/60* (2016.01)

(52) U.S. Cl.
  CPC ............ *H02J 50/60* (2016.02); *H04B 5/0037* (2013.01); *H04B 5/0075* (2013.01)

(56) References Cited

U.S. PATENT DOCUMENTS

| | | | | |
|---|---|---|---|---|
| 9,882,394 | B1* | 1/2018 | Bell | H02J 5/005 |
| 2015/0244424 | A1* | 8/2015 | Sung | H04B 5/0037 |
| | | | | 320/108 |
| 2015/0249484 | A1* | 9/2015 | Mach | H02J 5/00 |
| | | | | 307/104 |
| 2016/0006264 | A1* | 1/2016 | Alperin | H02J 5/005 |
| | | | | 307/104 |
| 2016/0054440 | A1* | 2/2016 | Younis | G01S 13/753 |
| | | | | 342/5 |
| 2016/0056635 | A1* | 2/2016 | Bell | G06F 1/26 |
| | | | | 713/300 |
| 2016/0056966 | A1* | 2/2016 | Bell | H04L 12/10 |
| | | | | 713/310 |
| 2016/0099614 | A1* | 4/2016 | Leabman | H01Q 1/243 |
| | | | | 307/104 |
| 2016/0099756 | A1* | 4/2016 | Leabman | H04B 5/0037 |
| | | | | 307/104 |
| 2016/0141908 | A1* | 5/2016 | Jakl | H02J 7/0004 |
| | | | | 320/108 |
| 2016/0191121 | A1* | 6/2016 | Bell | H04B 5/0037 |
| | | | | 307/104 |
| 2016/0197488 | A1* | 7/2016 | Hada | H02J 17/00 |
| | | | | 307/104 |
| 2016/0241696 | A1* | 8/2016 | Bjorklund | H04M 1/274516 |
| 2016/0276873 | A1* | 9/2016 | Ben Hanoch | H02J 50/12 |
| 2016/0336815 | A1* | 11/2016 | Alperin | H02J 7/025 |
| 2017/0126262 | A1* | 5/2017 | Zakaria | H04B 1/1036 |
| 2017/0316408 | A1* | 11/2017 | Bernesby | G06Q 20/3829 |
| 2017/0338684 | A1* | 11/2017 | Mishriki | H02J 7/025 |

* cited by examiner

METHOD AND SYSTEM FOR MANAGING WIRELESS POWER TRANSFER FOR ELECTRICAL DEVICES

CROSS-REFERENCE TO RELATED APPLICATIONS

This application is a U.S. National Phase Patent Application under 35 U.S.C. § 371 of co-pending International Patent Application No. PCT/IL2015/050008, which has an international filing date of Jan. 1, 2015, and which claims priority and benefit from U.S. Provisional Patent Application Ser. No. 61/922,813, filed Jan. 1, 2014, the contents and disclosure of which are incorporated herein by reference in their entirety.

FIELD OF THE INVENTION

The disclosure herein relates to systems and methods for managing wireless power transfer for communication devices. In particular the invention relates to a cloud based network management system for enabling remote activation of wireless power outlets to power communication devices associated with inductive power receivers.

BACKGROUND OF THE INVENTION

The spread of mobile devices such as mobile handsets, media players, tablet computers and laptops/notebooks/netbooks and ultra-books increases user demand for access to power points at which they may transfer power to charge communication devices while out and about or on the move.

Systems that provide the opportunity to transfer power for charging the communication devices in public spaces, in which the user of the communication device may remain for extended periods of time, say more than a few minutes or so are available to some extent, with limited convenience. Such systems may be distributed over various venues, requiring complex network architecture to provide the demand for wireless power transfer in public spaces. Amongst others, such public spaces may include restaurants, coffee shops, airport lounges, trains, buses, taxis, sports stadia, auditoria, theatres, cinemas or the like.

There is a need for such systems to enable easy activation of the device and allow power transfer for charging when the battery level runs low. The process of activation has involved various manual interactions handled by the user such as scanning of a Quick Response (QR) Code, manually entering a wireless receiver identification code (RXID) pre-printed on the product package and the like. These interactions may be intrusive and error prone. In particular, such system do not provide any means of communication with the device associated with a wireless receiver.

The invention below addresses the above-described needs.

SUMMARY OF THE INVENTION

It is according to one aspect of the disclosure, a computer implemented method is taught for a management server to associate a wireless power receiver with a communication device, the wireless power receiver is configured and operable to communicate with a wireless power outlet, to receive power from said wireless power outlet, and to provide power to the communication device. The communication device is labeled with a device identification code (UDID), the wireless power receiver is labeled with a wireless power receiver identification code (RXID), and the wireless power outlet is labeled with a wireless power outlet identification code (TXID), the method comprising:
receiving at least a first message from the communication device communicating at least the UDID and data pertaining to device location of the communication device;
receiving at least a second message from the wireless power outlet communicating at least the TXID and the RXID;
the management server comparing the device location with an outlet location associated with the TXID; and
associating the device having the UDID with the wireless power receiver having the RXID only if the device location matches the outlet location of the management server.

Where appropriate, the first message further including a first timestamp indicating the time at which said wireless power receiver is coupled to the wireless power outlet, and the second message further including a second timestamp indicating the time at which the wireless power receiver is coupled to the wireless power outlet.

The method may further comprise a step of associating the device having the UDID with the wireless power receiver having the RXID only if the first timestamp matches the second timestamp.

The method may further comprise the step of the management server sending a message to the communication device prompting a user to confirm device location.

Where appropriate, the management server may receive a plurality of UDIDs from a plurality of communication devices, the method may further comprise the management server sending a message to the communication device requesting a user to reinitiate coupling of the wireless power receiver and the wireless power outlet.

The method may further comprise a step of the management server authorizing a wireless power transfer session between the wireless power outlet and the wireless power receiver.

The method may further comprise a step of the management server associating the wireless power transfer session with said UDID.

The method may further comprise a step of the management server receives a plurality of UDIDs from a plurality of communication devices, the method further comprising:
saving details of said wireless power transfer session;
storing all of said plurality of UDIDs in a candidate set; and
if one of said plurality of UDIDs is subsequently associated with said RXID then associating said wireless power transfer session with the UDID associated therewith.

It is according to another aspect of the disclosure, a computer implemented method is taught for a communication device configured to receive power transfer via a wireless power receiver conductively connected thereto, the communication device labeled with a device identification code (UDID) operable to activate wireless power transfer from a wireless power outlet labeled with a wireless power outlet identification code (TXID) to the wireless power receiver labeled with a wireless power receiver identification code (RXID), said method comprising:
executing a power transfer software application on the communication device;
the power transfer software application accessing location data of the communication device;

the power transfer software application sending at least a first message to a management server communicating at least said UDID and data pertaining to device location of the communication device; and the wireless power receiver communicating the RXID to the wireless power outlet such that wireless power outlet sends at least a second message communicating the TXID and the RXID to the management server.

The method, wherein the step of executing the power transfer software application comprises:

downloading the power transfer software application to the communication device;

installing the power transfer software application onto the communication device; and configuring the power transfer software application to communicate with the management server.

The method, wherein the step of the said power transfer software application accessing location data of the communication device, further comprises receiving, via the power transfer software application, an instruction to enable location services.

The method, wherein the step of the power transfer software application accessing location data of the communication device, further comprises receiving, via the power transfer software application, an instruction to bring the communication device into range of the wireless power outlet.

Optionally, the wireless power receiver is selected from a group consisting of ring devices, cases, skins, backcovers, embedded devices and wirelessly enabled batteries.

Optionally, the location data is determined by the power transfer software application by accessing satellite positioning data values of the communication device.

Optionally, the first message further comprising a first timestamp indicating the time at which the wireless power receiver is coupled to the wireless power.

Optionally, the second message further comprising a second timestamp indicating the time at which the wireless power receiver is coupled to the wireless power.

BRIEF DESCRIPTION OF THE DRAWINGS

For a better understanding of the embodiments and to show how it may be carried into effect, reference will now be made, purely by way of example, to the accompanying drawings.

With specific reference now to the drawings in detail, it is stressed that the particulars shown are by way of example and for purposes of illustrative discussion of selected embodiments only, and are presented in the cause of providing what is believed to be the most useful and readily understood description of the principles and conceptual aspects. In this regard, no attempt is made to show structural details in more detail than is necessary for a fundamental understanding; the description taken with the drawings making apparent to those skilled in the art how the several selected embodiments may be put into practice. In the accompanying drawings.

DETAILED DESCRIPTION

Figure 1A:
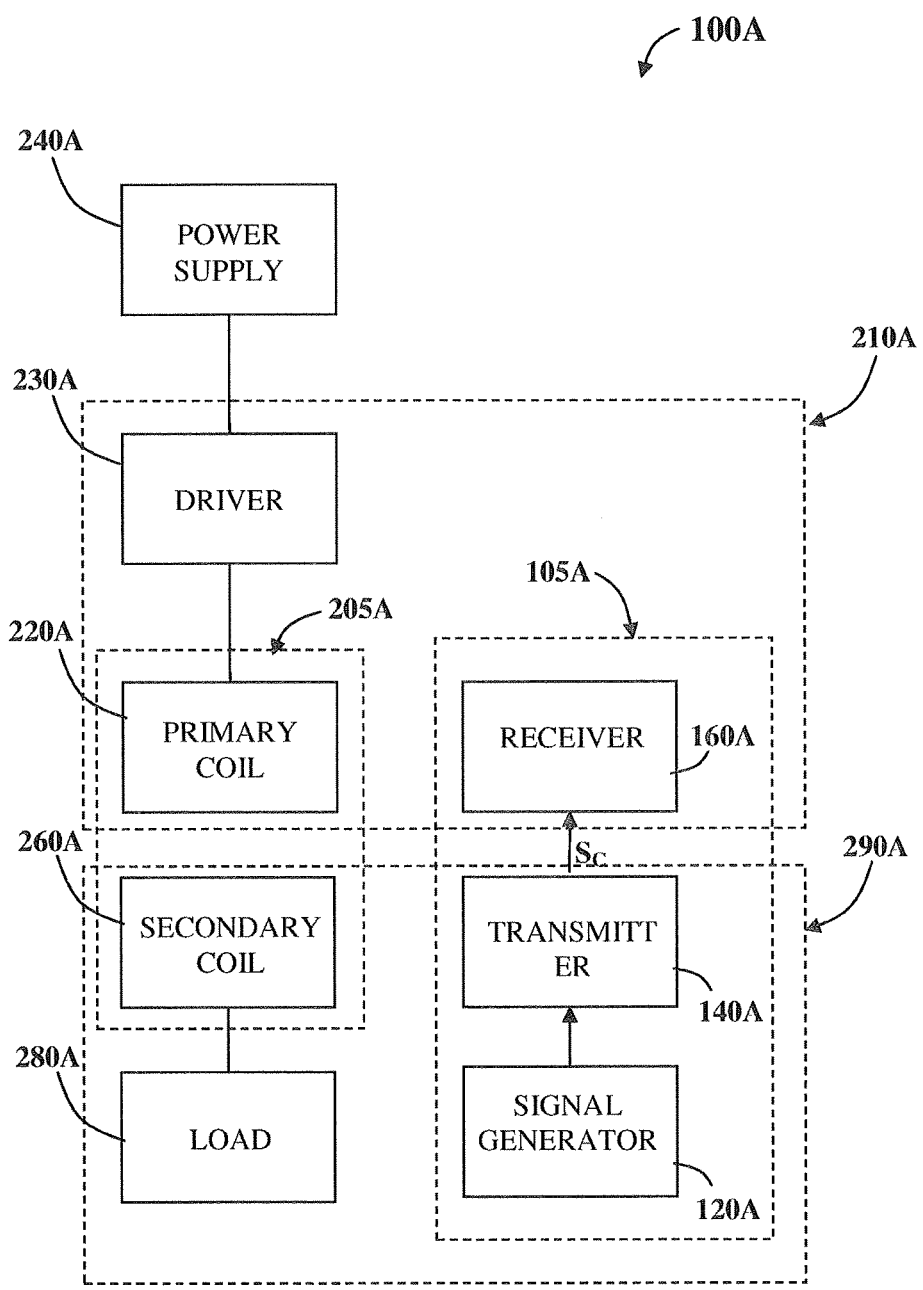
FIG. 1A is a block diagram showing the main elements of a possible wireless power transfer system including an inductive power coupling incorporating a signal transfer system according to a first embodiment of the invention.

Aspects of the present invention relate to providing systems and methods for managing a wireless power transfer network. A centrally managed system, using a cloud based management console, in communication with a management server may execute power management software to allow easy activation of wireless power outlets.

A communication device may be enabled to receive power wirelessly from a wireless power outlet by retrofitting a wireless power receiver such as a power ring, replacement back cover, wirelessly enabled sleeve or the like. Such wireless power receivers may be uniquely identified with a wireless power receiver identification code (RXID) and may be operable to initiate a wireless power transfer session by communicating this code to the wireless power outlet in order to associate that wireless power transfer session with the unique wireless power receiver.

Although the wireless power transfer session may be associated to the wireless power receiver, it may be desirable to further associate a wireless power transfer session with a particular user or device. However, where the wireless power receiver does not have a communication channel with the electronic device being powered in order to associate a particular wireless power transfer session with a particular user or device, activation processes have used various manual interactions handled by the user such as scanning of a Quick Response (QR) Code, manually entering a wireless power receiver identification code (RXID) pre-printed on the product package and the like. Accordingly, the wireless power receiver may be associated with the particular device or user and thus a wireless power transfer session associated with the wireless power receiver may be associated with that particular device or user.

Nevertheless, manual interactions may be intrusive for the user as well as being error prone. By contrast the systems and methods described herein may provide an easy activation process for associating a device labeled with a unique device identification code (UDID) with a wireless power receiver labeled by its RXID.

Power management software may provide a platform, centrally covering power management aspects of a network of wireless power transfer outlets distributed in public spaces for example. The power management software may provide a manager of a venue with the ability to manage the wireless power outlets (hotspots) that are installed therein. Optionally, the management software system, with higher system administration rights, may allow power management of several venues or manage the whole organizational power transfer outlet network. The power management software is operable to provide remote control and monitoring, maintenance of wireless power outlets coupled with system remote health checking, enable provisioning functionality, maintaining security and business goals using policy enforcement technique.

The wireless power outlet network management system may provide a set of functionalities such as network outlet discovery identifying the outlet units present on a network or a venue, availability and uptime, Network outlet monitoring to determine the health of outlet network components, mapping of network elements, maintenance and event management, performance and usage data collector, management data browser and intelligent notifications allowing configurable alerts that will respond to specific outlet network scenarios.

The power management and maintenance software may include operational aspects such as remote stop/start, remote restart, remote software upgrades and updates. Optionally, the remote maintenance functionality may include remote user indication control testing (LED, sound).

The power management software may enable remote health checks by performing a testing procedure of the software or hardware quality of the remote wireless outlet, or verifying the remote wireless power outlet is active by testing response to a communication signal. Optionally, the health procedure may test for "health' parameters, such as temperature, power consumption, connectivity status, current and the like. Further, the testing procedure may be a scheduled process or carried out on demand Where appropriate, an indication alert may be triggered.

Where wireless power transfer sessions are associated with particular devices or users, the power management software may enforce policies for command and control, these may include operational aspects such as power management policies to define who, when and where can charge and for how long, policies to define the type of service (current), policies to define type of device, dynamic policies optionally selected from a group consisting of real time management of power consumption, real time management of battery health, location traffic control in venue (send users to venues based on real time parameters values).

The power management software may include operational aspects of providing power transfer or control billing aspect associated with a communication device. Thus, the power management software may be operable to provide features such as aborting power provision of a power transfer outlet, continue providing power, modifying the service or controlling one or more aspects of the power transfer procedure by enforcing a new policy, for example, or the like, possibly according to operating signals received. The power management software may further be operable to handle user accounts, registration of devices, user specific information, billing information, user credits and the like.

It is noted the management software may further be operable to detect undesirable conditions while coupling health checking functionality and remote maintenance. For example, events such as adding or removing a wireless power outlet in a venue, may be detected.

Optionally, the system may be configured such that when a new wireless power outlet is detected, the system automatically responds in installing an appropriate policy.

Additionally or alternatively, the system may configured to transmit an alert the system administrator with an appropriate message.

The Management Console:

The system provides a management console communicating with the management server software application layer that may provide a manager of a venue with the ability to manage the hotspots that are installed therein, directly or via the venue gateways. Optionally, a manager with higher administrative rights may control a larger portion of the organizational network of wireless power transfer. The management console may be accessed through a web browser or an application on a computer, laptop, tablet and the like.

The management console may allow a manager to perform various tasks of managing the power provisioning process, remote maintenance, system health check, system monitoring, policies management and the like. A manager, for example, may be capable of viewing real time on/off status of hotspots; remote software updating or restarting a wireless power outlet, viewing usage statistics and generate reports per user/location/hotspot/time; create, edit, and assign usage policies per location/day-of-week/time/user.

The system may provide three levels of access and administration: Administrator, MAdmin and MUser, for example.

Administrator-level managers may have administrative rights to access all the information and the settings in the system.

MAdmin-level managers have access to the general settings for all the locations of a specific premises or group of premises. The MAdmin can create/delete/edit MAdmin and MUser accounts and assign rights to them.

MUser-level managers may have rights to one or more locations, for which he can view statuses, manage specific policies and get reports.

It is noted that further administrative rights associated with additional system administrators may be configured to answer various venue needs, providing read only, read/write access, for example, as required.

In certain embodiments, the system may have a flat hierarchy of the MUsers, where MUsers cannot be defined as managers of other MUsers, and there is no inheritance of rights from one user to another in a hierarchical way. Alternatively, the MUsers may be arranged in hierarchical structures Each customer may start with one MAdmin account, which may then create other MAdmin and MUser accounts. When an Admin account is created, the following may be set: company, type of admin, full name, phone, email, rights to manage a certain list of locations, and the like.

All the activities that MAdmins and MUsers perform in the system may be logged in a system log (date/time, user, type of activity, details).

Figure 2A:
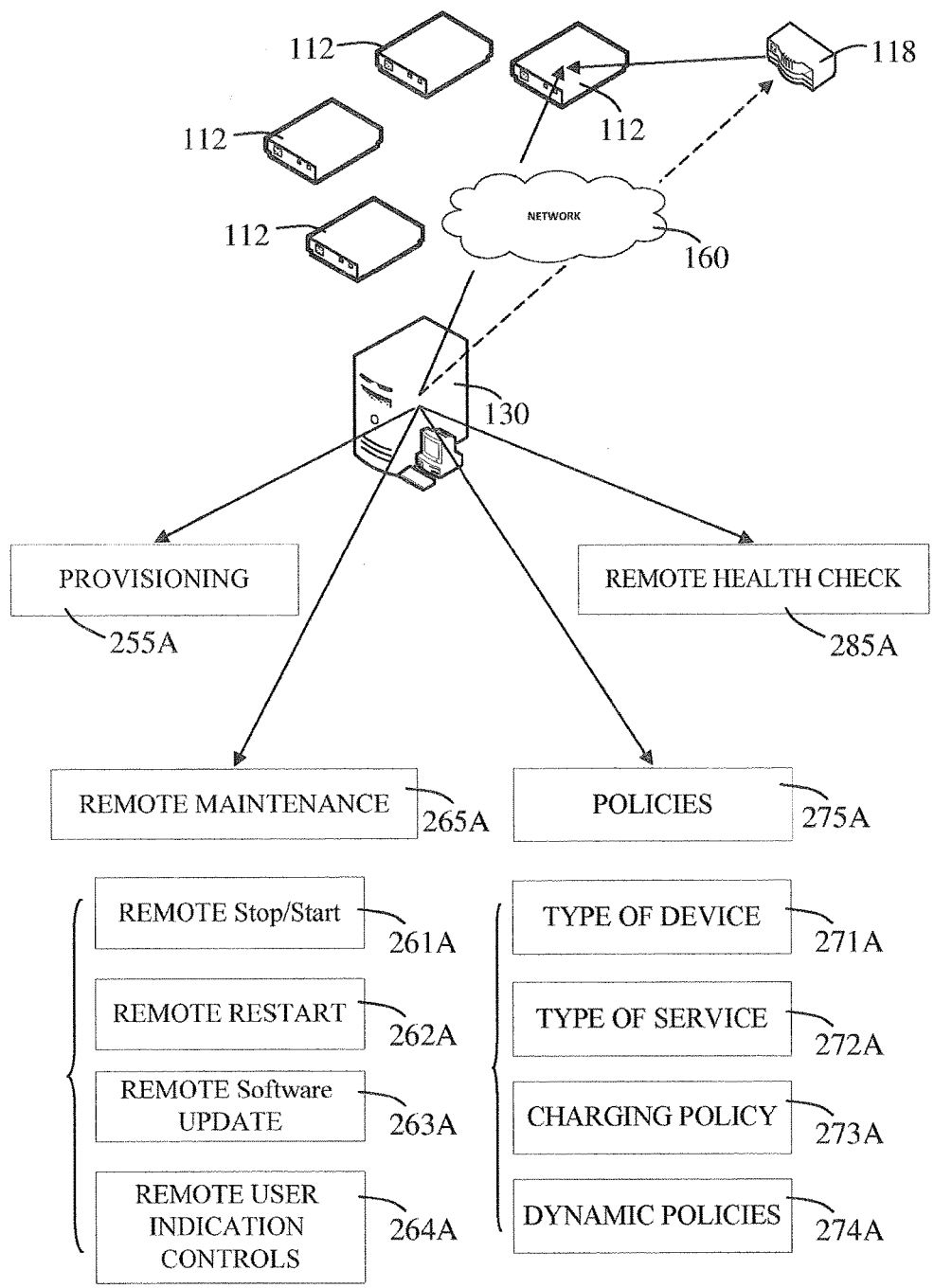
FIG. 2A is a block diagram representing selected actions of possible procedures covering aspects of the management functionality of a management server: health check, remote maintenance, provisioning and controlling power transfer by a policy(s)
Figure 2B:
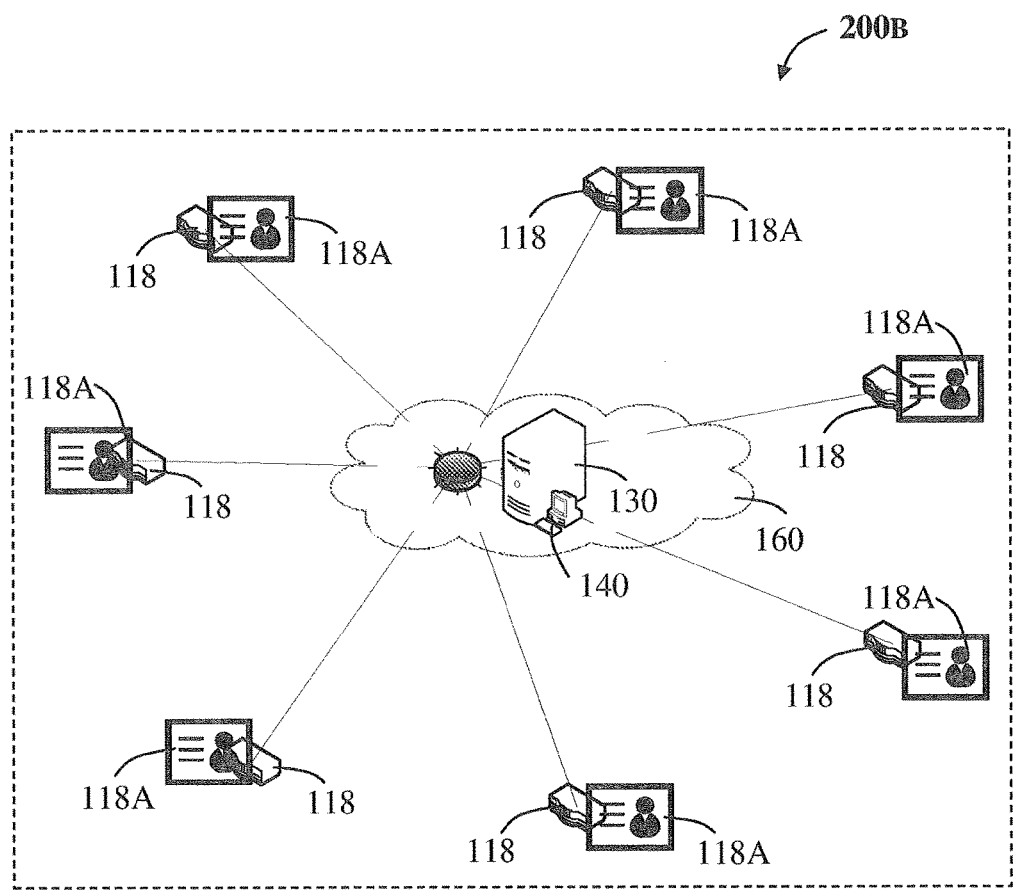
FIG. 2B is a schematic representation of possible power transfer network view, accessible on a management console, enabling the selection of a venue gateway for further actions.

The management console may allow a MAdmin or MUser to view a schematic diagram of the location of the Hotspots in a venue such as described in FIG. 2B and as described in the International Application no. PCT/IL2014/050203, the full content of which is incorporated herein by reference. The diagram may denote the status of the Hotspots with color or pattern indications. The status may include On, Off, Note-Used-Recently, faulty, and the like. The management console may also be operable to display usage statistics per user/Hotspot/time, in the form of, e.g., graphs on screed, formatted printable report, exportable CSV format and the like. Other possible reports include, e.g., charging patterns over time, list of Hotspots used and number of usages per each over time, list of locations with user charged and/or number in visits over time, statistics of usage of each type of user plan. For the graphs the time scale may have a slider that enables adjustment of the time scale—from data points every 1 minute to data points every one week. It is possible to have a non-continuous scale, e.g. 1 minutes—15 minutes—1 hour—4 hours—1 day—1 week.

A MUser may set policies for the 'Store promotion' layer of service: Add free charging minutes on top of $T_{free}$, based on criteria. A user/user group that qualify may be allowed to charge their device for free, variously, for: a specified number of minutes; at specified locations; during specified days of the week; at specified time slots. A policy may have a validity duration, e.g., valid between Date1 and date2, where date1<=date2 and date2 can be equal to 'no expiration'.

An administrator of the server may have the access to perform one or more of the following actions in the system:

The Administrator (Admin) may be able to do everything that a MUser can do, and may have rights to all customer accounts and all locations.

Where wireless power transfer sessions are associated with particular devices, the Admin may be able to overrule a policy for a specific device by overriding the base policies for that device. Such devices may be used at installation or at maintenance times to validate the proper operation of a Hotspot. The policy override may be time limited and may revert back to previous default policy when the time is up. The Admin may have access to devices that are designated with 'always on' or 'never on' policies, which may be referred to as "Golden Receivers".

The administrator may have visibility into the wellbeing of the installed components, e.g., alerts for gateways that did not communicate with the server over a specified period of time, alerts for Hotspots that did not communicate with the server over a specified period of time, and the like.

It is noted that a power provisioning software application may be installed on a mobile device and may be operable for receiving data pertaining to a wireless power transfer network of a mobile device.

Further, the power provisioning software application may be operable to be executed on a mobile device enabling to manage power requirements within a wireless power transfer network. The power transfer network system, may use a deployment of at least one wireless power outlet (in the public space) controlled via a management console and operable to manage wireless power transfer with the power receiver of a mobile device, at least one management server in communication with the at least one wireless power outlet, and a database in communication with the management server and operable to store data received by the management server from the at least one wireless power transfer outlet.

Where appropriate, the wireless power transfer system may allow wireless power transfer to communication devices of users such as mobile devices, smartphones, tablet computers, laptops and the like, at home, office and various public areas, and may be centrally monitored and controlled.

It is noted that the wireless power outlet may be operable to execute a software module with near communication features to communicate with the communication device, perform identification to verify user credentials and allowances, and further communicate with the management server. The management server may be operable to receive communication requests from the wireless power outlet comprising at least one data package to enable gathering of detailed user or device usage information, power status information and store the data in a database. The gathered data may include location and geographical information, user and device ID and other possible identification data, battery level information and the like.

As used herein, the term "virtual session" or "session" may refer to a hosted session of a virtual computing environment associated with a particular user that may be accessed from one or more client devices other than the host. For example, a session may include a thin client session, a virtual application session, a virtual machine session, a virtual operating system session, and/or the like. As used herein, a session described as being "between" a host device and a terminal device refers to the exchange of data between the host device and the terminal device, where the data is related to the session hosted at the host device.

As used herein, the term "terminal device" refers to a device configured to provide a user interface for a remotely hosted virtual session to a user associated with the virtual session.

As used herein, the term "management server" refers to a server configured to manage multiple inductive power outlets configured to provide power transfer to communication devices, and controlling the power charging between a communication device and an associated wireless power outlet. The term "management server" may be referred to herein as, variously, as a 'control server", "central server" or a 'server".

As used herein, the communication device may refer to, variously, a 'user device", an "electrical device", an "electronic device", a 'mobile device", a 'mobile electrical device" or a 'device". The device may be a communication device with a battery, e.g., a mobile handset, a media player, a tablet computer, a laptop/notebook/netbook/ultra-book, a PDA, a smart watch or the like. Alternatively, the device may be an accessory with a battery, such as earphones and the like, or a stand-alone battery. As a further alternatively, the device may be any powered device, including communication devices without a battery.

The wireless power outlet point may be referred to herein as, variously, a 'PAP", a 'hotspot" or a 'charger".

As used herein, the term "memory" or "memory unit" may represent one or more devices for storing data, including read-only memory (ROM), random access memory (RAM), magnetic RAM, core memory, magnetic disk storage mediums, optical storage mediums, flash memory devices or other computer-readable mediums for storing information. The term "computer-readable medium" includes, but is not limited to, portable or fixed storage devices, optical storage devices, wireless channels, a 'SIM' card, other smart cards, and various other mediums capable of storing, containing or carrying instructions or data For the purpose of clarity in description, the following description describes systems, devices, methods, and software for dynamically updating a session based on data received from an access card reader. However, it should be understood that the same principles may be applied to the receipt of authentication data from any type of peripheral or standalone access or authentication device, including access card readers, smart card readers, biometric data readers, keypads, buttons, near field communications (NFC) devices, and the like.

Management Server Functionality:

The management server may be capable of integration with external servers or services. Some integration may be for data enhancements and external validation of rights for users or devices, and others may be for managing a certain functional aspect of the system, such as: network management and monitoring, maintenance of remote units, policy enforcement, user management, device management, billing, advertising, socializing and the like.

Various functionalities may be available through the power management software, and may also be available to third-party applications through application programming interfaces (APIs) for the server or another client application. Without limiting the scope of the application, selected functionalities may include, amongst others:

Using satellite positioning, antenna triangulation, wireless network locations or in-door positioning location information to display a map with nearby public hotspots.

Booking a Hotspot in advance, and accordingly, the booked Hotspot will not charge for other users, only for the registered user when he arrives, and identified by the unique RxID.

Registering devices.

Checking power transfer statistics.

Buying accessories, charging policies.

Checking real-time power transfer balances for registered devices.

Setting notification methods, receiving notifications.

Setting an automatic check-in to the Hotspot location.

Setting automatic interactions with social networks, e.g. automatic check-ins, tweets, status updates, and the like.

Providing store-specific promotion updates via push notifications, for example, based on past and current usage of power transfer services and user's micro-location.

Using accumulated information of the usage of the wire transfer service, including locations and the like, to better target users with promotions/ads.

Creating loyalty plans for venues based on usage of the wire transfer services in their premises.

Providing services to users based on information that their social-network connections are/were at a close proximity.

Launching a third party application on a user's device based on past or current usage of power transfer services and user's micro-location.

Collecting statistical information associated with usage of the application

It is noted that if communication with the server cannot be established, the application may allow the providing of power transfer based on a predefined "offline policy".

System Architecture:

Some embodiments representing the current system architecture may use Client/Server technology, but are not limited and may use other network architectures such as a peer-to-peer architecture, where each node has equivalent responsibilities.

In software engineering, Client/Server architecture refers to a network architecture where each computer, device or process on the network is either a client or a server. Such network architecture is applicable to enterprise applications, and generally the presentation, application processing, and data management functions are logically separated and operable on various nodes (tiers) of the system.

The client software (or the user agent) allows the interaction between the client machine (a dashboard terminal, a workstation, a dedicated wireless power outlet or a communication devices) and the application layer. When web-based applications are used, the client node (usually a browser) renders the user interface, which may be generated by a presentation layer on the client side or the server side by interpreting the HTML, Java applets, or ActiveX controls, for example.

The presentation layer is software allowing the visualization functions for the application (on a dashboard terminal, electrical mobile device) and may comprise static objects such as images, form fields receiving retrieved data from the database layer, or may use dynamically generated objects to allow populating the data appropriately, and displaying the result of the analysis or computation produced by the application layer. The output of the presentation layer may be submitted to a dashboard, and further formatted to be presented on a terminal dashboard, for example. On web-based applications, the presentation layer may be implemented by web servers.

The application layer provides the business logic of the distributed system of wireless power transfer network and the management software may be installed on a management server. The application layer may receive procedure invocations from the presentation layer, to which it returns the results of the application logic (computation or the analysis) performed on the management server. The application layer may further communicate with the database layer to store, update and retrieve data. The management database layer may store the application data, such as business logic and policies, third party business related information, user information, geographical locations, device IDs, power transfer duration and additional related information. The management database software may be installed on the management server or on a separate server (node). For any case, a database interface may be required in order to implement the business logic, allowing connecting to the database server(s) to retrieve, update and store data.

It is noted that in software engineering, such a complex client/server network architecture in which presentation, application processing, and data management functions are logically separated may be referred to as a multi-tier architecture. The most widespread use of multi-tier architecture is the three-tier architecture, where the client may be the first tier (presentation layer), the management server is the second tier (application logic processing) and the database server is the third tier (data management).

Further, the interaction between the communication device and the wireless power outlet may fit under the technology of two tier Client/Server architecture, where the wireless power outlet acts may act as either the server or client as required. Additionally, the wireless power outlet, in a mode of transmitting data, serves as a client responding to application logic requests (from the management server).

Client-server architectures, in their simplest form, are sometimes called two-node (tier) architecture. Three-node (tier) architecture of a Client/Server system is typically composed of a presentation node, a business or data access node, and a data node.

Management and User Identification:

It is noted that the current disclosure enables a wireless power transfer session to provide wireless power transfer from a wireless power outlet to a communication device via a wireless power receiver associated with the communication device. Accordingly, a unique association is established between the communication device and the wireless power receiver, enabling the association of the wireless power transfer session with particular devices and their users.

The communication device may be labeled with a device identification code (UDID), the wireless power receiver may be labeled with a wireless power receiver identification code (RXID), and the wireless power outlet may be labeled with a wireless power outlet identification code (TXID).

The wireless power receiver may be configured and operable to communicate the RXID to the wireless power outlet thereby associating the wireless power transfer session with the RXID.

A management server may be configured and operable to associate a wireless power receiver with the communication device by receiving the UDID directly from the communication device along with additional session parameters such as location, timestamp and the like and receiving the RXID from the wireless power receiver via the wireless power outlet along with a TXID indicating matching session parameters.

Description of the Embodiments:

It is noted that the systems and methods of the invention described herein may not be limited in its application to the details of construction and the arrangement of the components or methods set forth in the description or illustrated in the drawings and examples. The systems, methods of the invention may be capable of other embodiments or of being practiced or carried out in various ways.

Alternative methods and materials similar or equivalent to those described herein may be used in practice or testing of embodiments of the invention. Nevertheless, particular methods and materials are described herein for illustrative purposes only. The materials, methods, and examples are not intended to be necessarily limiting.

Accordingly, various embodiments may omit, substitute, or add various procedures or components as appropriate. For instance, it should be appreciated that the methods may be performed in an order different than described, and that various steps may be added, omitted or combined. Also, aspects and components described with respect to certain embodiments may be combined in various other embodiments. It should also be appreciated that the systems, methods, devices, and software may individually or collectively be components of a larger system, wherein other procedures may take precedence over or otherwise modify their application.

Figure 1B:
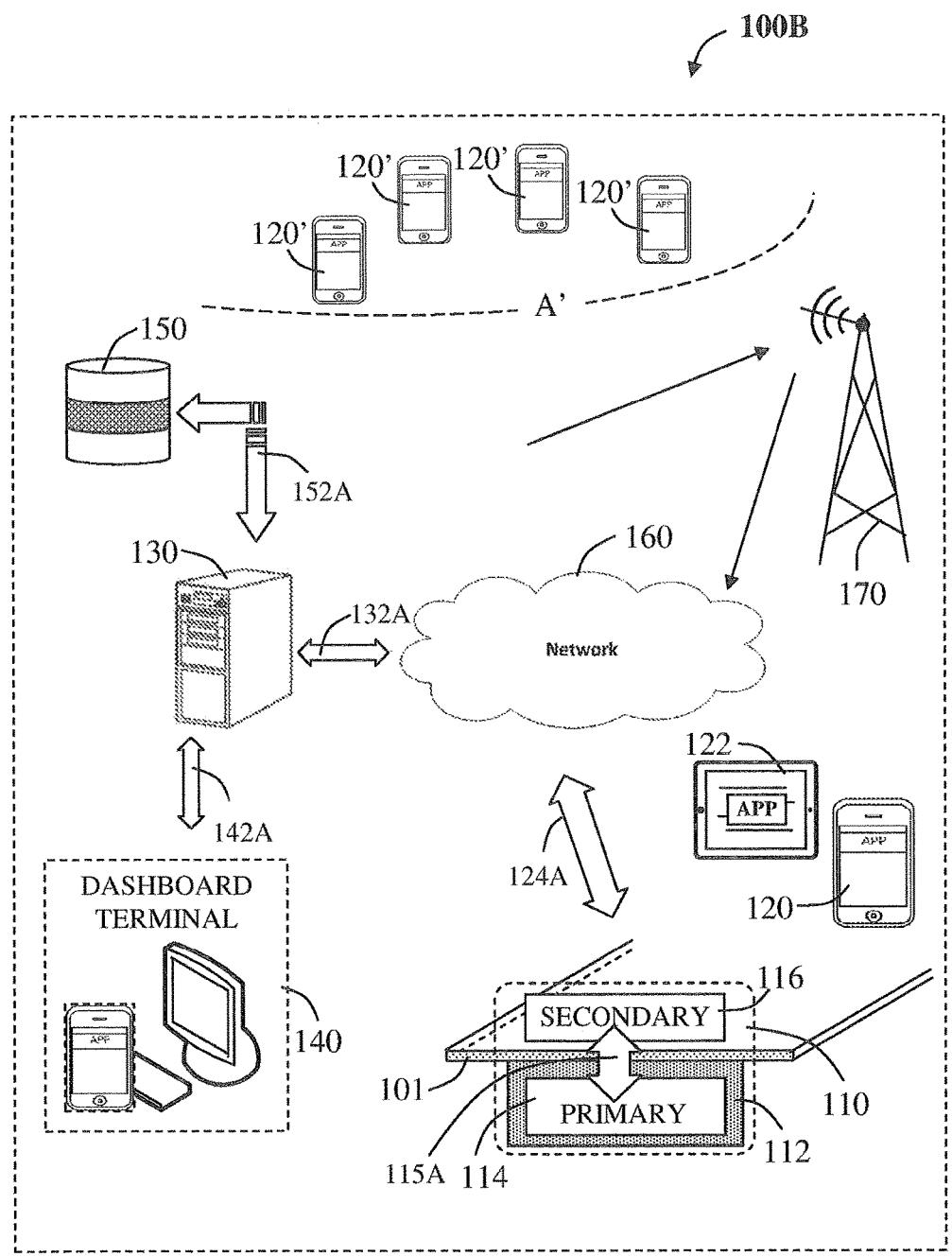
FIG. 1B is a schematic representation of selected elements of a distributed system for powering communication devices via wireless power outlets and receivers.
Figure 1C:
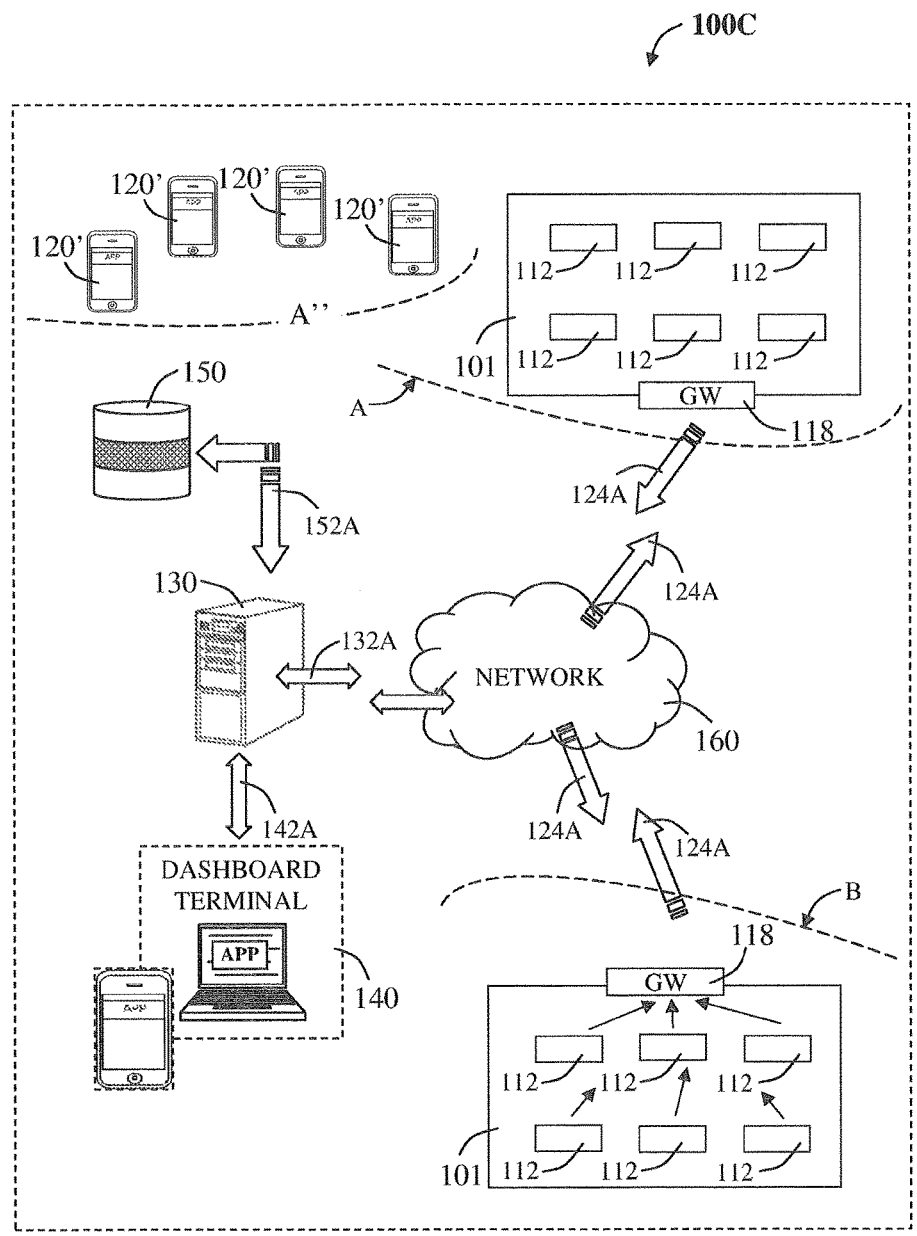
FIG. 1C is a schematic representation of selected elements of a distributed wireless power transfer network for powering electric devices via local gateways.

Reference is now made to FIGS. 1A-C schematically representing a local configuration of a power transfer system 100A and distributed system architectures 100B and 100C for providing power transfer to mobile devices, combined possibly with business data gathering of wireless power transfer to communication devices, according to the current disclosure. The local configuration system 100A may be manageable remotely as illustrated in the distributed power transfer system 100B of FIG. 1B, providing external network connectivity and internet access by each inductive power outlet, while the distributed system 100C of FIG. 1C provides the external network connectivity for each inductive power outlet via the local venue gateway(s) 118. Examples of managing distributed wireless power transfer network and business power management are described in International Applications nos. PCT/IL2014/050203 and PCT/IL2014/051107, the full contents of which are incorporated herein by reference.

It is noted that the power management and business data gathering software provides functionality of device power storage management combining the status of the power storage unit of the electric mobile device, user preferences and current location to offer various power related recommendations and directing the user to the nearest power transfer location, accessible according to the potential locations of servicing wireless power transfer.

Reference is now made to FIG. 1A showing a block diagram of the main elements of a locally configured system 100A providing power transfer from a power outlet to an electric device. The system 100A comprising an inductive power coupling 205A incorporating a signal transfer system 105A according to an aspect of the invention.

The inductive power coupling 205A consists of a primary inductive coil 220A and a secondary inductive coil 260A. The primary coil 220A is wired to a power supply 240A typically via a driver 230A which provides the electronics necessary to drive the primary coil 220A. Driving electronics may include a switching unit providing a high frequency oscillating voltage supply, for example. The secondary coil 260A is wired to an electric load 280A.

When the secondary coil 260A is brought within range of the primary coil 220A, the pair of coils may form an inductive couple such that power is transferred from the primary coil 220A to the secondary coil 260A. In this way a wireless power outlet 210A may provide power to a wireless power receiving device 290A. Additionally or alternatively, power may be transferred from the primary coil 220A to the secondary coil 220B via transmission and pick up using tuned resonance coils. Although only inductive power transfer is described above other wireless power transmission methods such as MIMO (multiple input, multiple output) power transfer as described in the applicant's co-pending U.S. Patent Application Ser. No. 62/090,058, will occur to those skilled in the art.

The signal transfer system 105A provides a communication channel between the wireless power receiver 290A and the wireless power outlet 210A. For example a signal transfer system 105A may comprise: a signal generator 120A, for generating a control signal $S_C$; a transmitter 140A for transmitting said control signal $S_C$; and a receiver 160A for receiving said control signal $S_C$.

Although in the signal transfer system 105A described herein, the transmitter 140A is incorporated into the wireless power outlet 210A and the receiver 160A is incorporated into the wireless power receiving device 290A, it will be appreciated that a transmitter 140A may alternatively or additionally be incorporated into the wireless power receiving device 290A and a receiver 160A may alternatively or additionally be incorporated into the wireless power outlet 210A.

The control signal $S_C$ may communicate encoded data pertaining to the power transmission. This data may be pertinent to regulating efficient power transmission. Examples of such data includes parameters such as: required operating voltage, current, temperature or power for the electric load 280A, the measured voltage, current, temperature or power supplied to the electric load 280A during operation, the measured voltage, current, temperature or power received by the electric load 280A during operation and the like.

In other embodiments, the control signal $S_C$ may communicate data relating to the coordinates of the primary inductive coil 220A for the purposes of indicating the location of the power outlet 210A. Alternatively, the control signal $S_C$ may communicate data relating to the identity or presence of the electric load 280A such as the location of the secondary coil 260A, or an identification code or the electric device 290A or its user.

Various transmitters 140A and receivers 160A may be used with the signal transfer system. Where the primary and secondary coils 220A, 260A are galvanically isolated for example, optocouplers may have a light emitting diode serving as a transmitter 140A which sends encoded optical signals over short distances to a photo-transistor which serves as a receiver 160A. Optocouplers typically need to be aligned such that there is a line-of-sight between transmitter and receiver. In systems where alignment between the transmitter 140A and receiver 160A may be problematic, optocoupling may be inappropriate and alternative systems may be preferred such as audio signals transmitted by speakers and picked up by microphones, ultrasonic signals transmitted by piezoelectric elements or radio signals such as Bluetooth, WiFi and the like as well as other signal transmission methods known as will occur to those skilled in the art. Alternatively the primary and secondary coils 220A, 260A may themselves serve as the transmitter 140A and receiver 160A such as for data-over-coil communication.

FIG. 1B schematically representing a distributed system 100 for providing power management and business data gathering pertaining to wireless power transfer for communication devices, according to the current disclosure. The distributed power management system 100B comprises a wireless power transfer component 110, a management server 130, a management database 150, a communication network 160 and a mobile communication network 170. Optionally, the distributed data gathering system 100B comprises a dashboard terminal 140.

Optionally, the distributed wireless power management 100B may be used for external network connectivity and internet access for each wireless power outlet 112, providing wireless power transfer technology and at least one location for wireless power transfer for communication devices, searchable by the power management software application, according to the current disclosure. The distributed system 100B comprises a wireless power transfer component 110, a management server 130, a management database 150, a communication network 160 and a mobile communication network 170. The section noted 'A-A' of FIG. 1B, represents the public space of users, using mobile devices 120' installed with a power management software application.

Optionally, the distributed wireless power management system 100B comprises a dashboard terminal 140.

Optionally or additionally, the users within the public space noted 'A-A', each using an electrical mobile device 120' connectable via the social network, enabling to share data and information with other member of the social community.

The wireless power transfer component 110 comprises two sub-components, the inductive power outlet 112, optionally embedded into a surface 101, comprises a primary inductor 114 and connectable to power supply (not shown) and an electrical mobile device, such as a smartphone 120 and tablet 122, each comprising a secondary inductor 116 connected to a load and capable of coupling with the primary inductor 114 to allow wireless power transfer to the electrical mobile device. The inductive power outlet 112 may be referred to as a hotspot (HS) and may further include a LED display operable to display on/off/dimmer/fade-in-out signals.

It is noted that each electrical mobile device 120, 122 may have a unique identifier, which may be referred to as a receiver identification (RxID). The electrical mobile device 120, 122 may be identified by an inductive power outlet 112 when the communication device 120, 122 and the inductive power outlet 112 are in close proximity. The inductive power outlet 112 may have a unique identifier, which may be referred to as a transmitter identification (TxID).

It is further noted, that communication between the inductive power outlet 112 and the communication device 120, 122 may use the communication channel 115A to communicate between one another, and optionally establish credential exchange to allow power provisioning.

The inductive power outlet 112 may communicate with the communication network 160 via the communication channel 124A independently from the communication device 120, 122, allowing internet-based communication, further communicating with the management server 130 through a communication channel 132A. Variously, the communication channel 152A may further be used to communicate with the management database 150, in a stand-alone database configuration, or having the management server and the management database installed on the same machine.

Optionally, the inductive power outlet 112 may communicate externally using cellular communication infrastructure 170.

The communication process between the inductive power outlet 112 and the management server 130, may be operable to perform sending of various periodic status and non-periodic events. The various data may be communicated such as TxID, RxID identification codes, wireless power transfer session parameters and additional information such as timestamps, starting power transfer notifications, stopping power transfer notifications, location of power outlet, modifying service in some way, receiving server permission commands, on/off commands for aborting power provision or resuming, charging balance status and the like.

The terminal dashboard 140 (optionally other types of clients, such as electrical mobile devices and the like) may use the communication channel 142A to communicate with the application layer of the management server 130.

It is noted that the wireless power outlet 112 may communicate with the electrical mobile device 120, 122 exchanging identification information as described in the "Data gathering—Management and User Identification" section, and further send periodic status messages and non-periodic events to the management server 130. This type of communication, while using wireless power transfer may provide an indication of the current location of a wireless power outlet. It is noted that because many wireless power outlets have fixed positions, the TXID may itself provide an indication of the location of the outlet. However, where the wireless power outlet is itself mobile, for example in the the case of a hotspot on a traveling vehicle such as a car, bus, train or the like, another positioning system, such as a satellite positioning system or the like, may provide outlet location data directly.

FIG. 1C schematically representing a distributed power transfer system 100' for providing wireless power management including business data gathering of electrical mobile devices, communicating externally via a local venue gateway, according to the current disclosure. The distributed business power management system 100C comprises two sets of inductive power outlets 112 located in area A and B, a local venue gateway 118, a management server 130, a management database 150, a communication network 160 and a mobile communication network 170. Optionally, the distributed business power management system 100B comprises a dashboard terminal 140, while the section noted 'A-A' of FIG. 1B, may represent the public space of users, using mobile devices 120' installed with a power management software application.

Optionally or additionally, the users within the public space noted 'A-A', each using an electrical mobile device 120' connectable via the social network, enabling to share data and information with other member of the social community.

The section noted 'A-A' of FIG. 1C, represents the public space of users, using mobile devices 120' installed with a power management software application.

The inductive power outlet 112 may be capable of communicating with the local venue gateway 118, wirelessly or using the venue Ethernet resources. The local venue gateway 118 has access to the communication network 160 through communication channel 124A, enabling the inductive power outlet 112 to send periodic status and non-periodic events and reporting the management server 130.

It is noted that area A and area B represent two different sets of inductive power outlets, where each inductive power outlet of in a set may communicate event notification messages via the local venue gateway 118, possibly according to setting configuration of the local venue gateway 118 or the setting of the inductive power outlet 112 itself. Optionally, the inductive power outlet 112 may be configured to function in dual mode, either through the local venue gateway 118 or communicate directly with the communication network 160, to provide improved online functioning. Thus, the inductive power outlet 112 of the distributed system 100C may differ from similar units of the system 100B of FIG. 1B.

It is further noted areas A and B, may represent separate rooms, for example, in the same venue, or may represent separate installations in different venues. Further, a single gateway 118 may manage a limited number of inductive power outlets, say six, and if the deployment requires more inductive power outlets, additional gateways may be a required.

The Communication Module:

A communication module may provide various aspects of the communication requirements between the components of the wireless power transfer distributed system, and may vary according to different communication needs of the components. For example, the communication requirements between the electrical mobile device and the wireless power outlet need different functionality and technology from the communication requirements between the wireless power outlet and the management server. Thus, when referring to the communication module, it is intended to clarify the various aspects and the communication technology that may be associated with specific interaction.

Communicating with the Management Server:

Optionally, the electrical mobile device may have a wireless LAN/WAN communication unit, which does not necessarily have to match the LAN/WAN transmission unit of the wireless power outlet. Furthermore, the electrical mobile device may include a near communication module capable of communicating with the module on the wireless power outlet.

The management or control server may be in communication with the wireless power outlet, the electrical mobile device, or both. The communication channel may be mediated by wireless access points, cellular networks (FIG. 1), wired networks or the like that may provide an internet protocol (IP) connection to at least one of the communication devices or the wireless power outlet. It is further noted that optionally, the communication channel to the wireless power outlet may be mediated indirectly via the communication device and the close communication module. Similarly, the communication channel to the communication device may be mediated indirectly via the wireless power outlet.

Tx-Rx Communication:

Each wireless power receiver may have a unique identifier, which may be referred to as a receiver identification (RxID), in the system that allows the recognition thereof. The RxID may be a MAC address. The management server may store user or communication device related information in addition to the RxID, such as power transfer related data, billing information, user credits or the like.

Where appropriate, wireless power outlets may have a unique identifier, which may be referred to as a transmitter identification (TxID), in the system that allows the recognition thereof.

For illustrative purposes only, possible methods for providing access to power for communication devices in public spaces are presented hereinafter. The method may allow a user to transfer power or charge a communication device such as a mobile phone, a tablet or the like from a wireless power outlet and may further allow a power provider to manage the power transfer, while gathering power transfer related information.

A user may place or connect a communication device to a wireless power outlet. For example an inductively enabled device may be placed upon a wireless power outlet or the wireless power receiver may be brought within range of a loosely coupled resonant wireless power outlet transmitter. Alternatively, or additionally, a power supply may be conductively connected to an electrical device.

The power access point may detect the device connection. For example, wired connection may be detected by detecting the load and wireless connection may be detected using various remote sensors such as hall sensors, analog ping schemes or the like.

Initial Authentication/Handshake:

The wireless power outlet may enable power transfer for a predefined time $T_{free}$ during which time period user credentials may be authenticated.

Optionally, the wireless power outlet may transmit a random pattern to the device via the close communication. The wireless power outlet may further transmit that same pattern to a control server via a WAN/LAN connection.

For example, a software application running on the communication device may be operable to receive the pattern and to relay the same pattern to the management server along with user identification token.

Variously, the management server and communication device may exchange multiple messages to complete authentication of the user.

Optionally, the wireless power outlet may initiate a registration process upon first-time interaction with the management server to determine initial setup, providing credentials to allow accessing the management server. It is also noted that the first-time authentication may be used for the agreement of the management server to manage the outlet Tx and agreement with regard to the identification of each side, the identity of the outlet Tx and the identity of the management server, for any further communications.

The management server may thereby be able to associate the specific wireless power outlet with the specific wireless power receiver. Where the wireless power receiver is associated with a particular communication device the wireless power outlet may also be associated with that communication device. Accordingly, if the user is deemed permitted to use the service the management server may send a confirmation signal allowing the wireless power outlet to continue servicing the communication device. Where required, the confirmation signal may define a specific time period for which the service is granted or send a disconnect event on termination of that time.

Where appropriate, the management server may additionally or alternatively define multiple levels of service, for example, as expressed in terms of current provided to different users. By way of example, paying users may be enabled to access full powering capability, perhaps up to 20 watts or so, while non-paying users may be provided limited access to say 0.5 watts which may be sufficient to charge only low power devices or perform trickle charge for completely depleted batteries.

During operation the wireless power outlet may be operable to receive operating signals from the management server. According to the operating signals received, the wireless power outlet may be operable to perform various actions such as to continue providing power, to abort power transfer, to modify the service in some way or the like.

As noted herein, various methods may be implemented for enabling close communication between the communication device and the wireless power outlet.

Data-over-coil (DOC) Communication:

Alternatively or additionally, the close communication channel may be provided by the wireless power outlet initiating the activation of power transfer to the communication device. The initiation of power supply is detected by most communication devices as power transfer connection and disconnection events that are communicated to the application layer on these communication devices.

The switching pattern may be coded with an identification signal such as the random pattern. The wireless power outlet may need to perform this switching in intervals spaced sufficiently apart to allow the communication devices to detect and report to application level power transfer connection and disconnection events.

Bluetooth and NFC:

Still other embodiments may use Bluetooth, Bluetooth Low Energy, WiFi, Zigbee or Near Field Communication (NFC) to achieve the close communication channel. These could be combined with the basic power signal to trigger their activation thereby conserving power.

In various embodiments of this system the LAN/WAN interface of the device may be WLAN or Cellular 2G/3G/4G connections. The connection to the WLAN or Cellular access point may also include manual or automatic insertion of user credentials. In this case the information may be conveyed to the management server to enable user identification. The information provided in order to allow access may also be stored by the device application and later provided directly to the management server.

Additionally, or alternately the LAN/WAN connection of the wireless power outlet may be achieved via the charged device. The wireless power outlet may encrypt messages to the management server and deliver this to the application on the communication device via the close communication channel therebetween. The application may then send the message to the server via its LAN/WAN connection.

Database Interfacing:

The management server may provide an Application Program Interface (API) to allow the various component applications to access the management server, with further applicable access to data stored in the database(s). Accessing the database directly from the management server may use a command shell, which may come bundled with about every database selected.

The data may be stored in tables (relational database such as Oracle, Informix, Microsoft SQL Server, MySQL, NoSQL and more), objects (object oriented database) or documents/files (documented oriented database such as XML—Extensible Markup Language) and the like.

The database, installed on the same physical machine or separately, may be accessed through a common database interface such as Sequence Query Language (SQL).

Alternatively, the database may be accessed by an object oriented API, providing database-abstraction API to create, retrieve, update and delete objects, or use XML based API or the like.

It is noted that that each API may be implemented in various computer languages such as C, C++, C#, Java, JavaScript, Python and the like.

It is also noted that the interaction with the database may be transaction base, allowing to configure a set of commands For example, anything between the 'transaction start' and 'transaction commit' methods are not executed until 'transaction commit' is called, if no exception occurs. Rolling back the changes and cancelling operation may use a 'transaction rollback' method, returning the database to the original state if a problem occurs even though a number of changes may have executed to the database's tables.

Reference is now made to the block diagram of FIG. 2A representing selected actions of possible procedures for providing the administrator with the management functionality for monitoring and controlling a deployment of a wireless power outlet configuration in a venue. The possible management procedures may include provisioning 255A data, remote maintenance 265A policies management 275A and remote health check 285A.

It is noted that the management server 130 may support direct interaction through the network 160 with each remote wireless power outlet 112 in a specific venue, or communicate with the venue gateway 118 to control each wireless power outlet 112. Although only one gateway 118 is described for illustrative purposes only, it will be appreciated that multiple gateways 118 may be controlled by a common management server 130.

The provisioning 255A procedure, may include communication with the provisioning software application of an electric device, to provide the provisioning policy for a user when in communication with a wireless power outlet in a location. The provisioning 255A procedure may further provide reporting functionalities, mapping of power transfer location according to electric device location and the like. The provisioning software application of an electric device may be used for paid power transfer, enabling to monitor and control power charging of the device.

The remote maintenance 265A procedure, may provide remote management of the wireless power outlet and may include remote stop/start 261A, remote restart 262A, remote software update 263A, and testing of remote user indication 264A such as a visual interface such as a LED indicator for example or an audio interface such as a speaker of other such sound generator.

The power management policies management unit 275A, provides functionality of determining a set of policies of various aspects for controlling the wireless power outlet when interacting with a power receiver of an electric device. The power management policies management 275A procedure may generate various power management policies that may be appended into a single control policy. The policies management unit 275A may include type of device policy 271A, type of service policy, and a power transfer policy 273A. The policies management 275A may further include various dynamic policies 274A such as real time optimization of power consumption, real time optimization of battery health and may further control traffic at the venue site by communicating with members in the social space, for example, to add more traffic into the venue by suggesting to meet friends, advertising businesses in the vicinity with characteristics related to user preferences based on real time parameters and the like.

The remote health check 285A testing a remote wireless power outlet may be used to test accessibility and operability of the outlet unit and if the outlet is reachable across the network. Further, the process analyzes the connection's latency, determining the network speed, which may also be presented to the system administrator. Such a health check may be triggered on demand for a specific wireless power outlet in a specific venue, testing its status or may be triggered sequentially for all listed, potentially operable, wireless power outlets in a network when the network system is presented on the management server console, upon administrator communication request, providing various related parameters, including the status of the wireless power outlet itself.

Accordingly, the health check procedure 285A may transmit a control signal to the remote wireless power outlet, waiting to a response within a time limit.

It is noted that the provisioning procedure 255A may communicate with the wireless power outlet allow more accurate data for provisioning software applications, such as location. Information regarding the location of the Hotspot may be associated with the TxID of the wireless power outlet. Such location information may be programmed into the Hotspot at, e.g., the time of installation, and may provide very accurate location information, which may be more accurate than what may be provided through other methods, such as GPS or antenna triangulation. Where the power provisioning software is an application configured for a mobile device, the Hotspot may transmit information regarding itself (e.g., TxID, location, and the like) to the device, which then transfers the information to the application. The application may further identify the location using GPS, antenna triangulation, in-door positioning methods and the like. Such data, may be transmitted by the wireless power outlet to the provisioning layer of the management server.

It is further noted that the various policies and other business related matters of the policies management procedures 275A, may be stored centrally in the database of the management server (130, FIG. 1B), may include power transfer policies of the service supplier and/or provider, various policies, agreements or offerings of public business entities that may be relevant from end user perspective, and the like.

The outcome of the set of procedures may yield options enabling the administrator or the user various actions such as to get address and business hours, locate the public entity destination on a map, get driving directions, adjust search radius to reduce or expand number of possible options, filter by brand of the public entities, filter by ranking of social space members, number of Hotspot in a specific public entity, coupons and promotions, receiver accessories sales and the like.

Reference is now made to FIG. 2B schematically represents a distributed wireless power transfer network view 200B, accessible on a management console, providing an overview of a deployment, optionally displayed on a management console, whereby a gateway is controlling several wireless power outlets in a specific venue. The distribution view 500 includes a central management 130, an associated dashboard terminal 140 (the management console), a communication network 160 to allow the management server to communicate and at least one venue gateway 118.

Such a distribution display, may allow the administrator to gain an overview of the whole network under his/her administration, optionally select other view to analyze various other aspects of the network by selecting a specific area of the display, selecting a gateway 118 and displaying its status and information in a popup window 118A, or further select a gateway 118, opening the sub-network of wireless power outlets controlled and monitored by that gateway. Viewing the sub-network of wireless power outlets may further allow actions of controlling and monitoring a specific outlet 112.

Figure 3A:
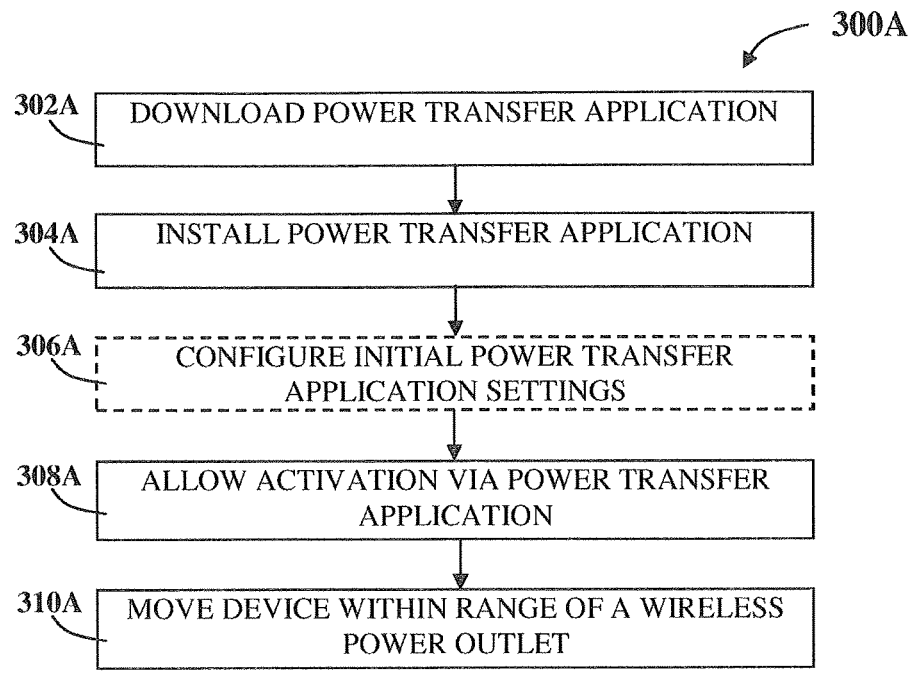
FIG. 3A is a flowchart representing selected actions of a method for installing and initializing a power transfer software application for managing wireless power transfer.

Reference is now made to the flowchart of FIG. 3A, representing selected actions of a possible method 300A for installing and initializing a power transfer software application on a communication device.

The method may include the downloading of a power transfer software application onto the communication device—step 302A. The power transfer software may be operable to enable the communication device to communicate with a remote wireless power transfer management server. Such power transfer software may optionally be obtained from an online source such as the Google App Store for Android operating system application or Apple App Store for an Apple iOS operating system application or the like.

The power transfer software may be installed on the communication device—step 304A. Optionally, the initial settings of the software application are configured—step 306A. It is particularly noted that the device may be configured to allow activation via the power transfer software application—step 308A. Where appropriate a notification may be received from the central management server prompting a user to bring the device within range of a wireless power outlet—step 310A. For example, a wireless power receiver may be connected to the device and the device may be positioned adjacent to the wireless power outlet or the communication device may be brought into the vicinity of a loosely coupled resonant wireless power outlet transmitter.

Figure 3B:
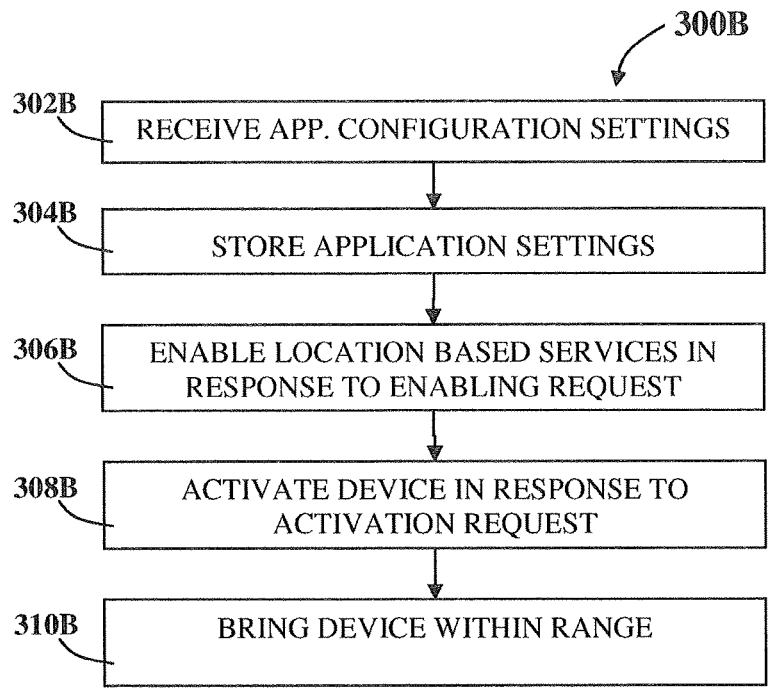
FIG. 3B is a flowchart representing further possible actions of a method for enabling a communication device to activate a wireless power outlet.

Reference is now made to flowchart of FIG. 3B, representing further possible actions of a method 300B for enabling a communication device to activate a wireless power outlet The method may include receiving power transfer software application configuration settings—step 302B, optionally from the central management sever. The received settings may be stored in the memory of the communication device or a repository—step 304B. It is noted that the software is enabled to access the location based services of the communication device—step 306B. Accordingly, the application may prompt the user to provide such access in response to receiving an enabling request via the software application popup or the like. The communication device may further be activated in response to activation request via the software application—step 308B; making the device ready for activation—step 310B.

Figure 4A:
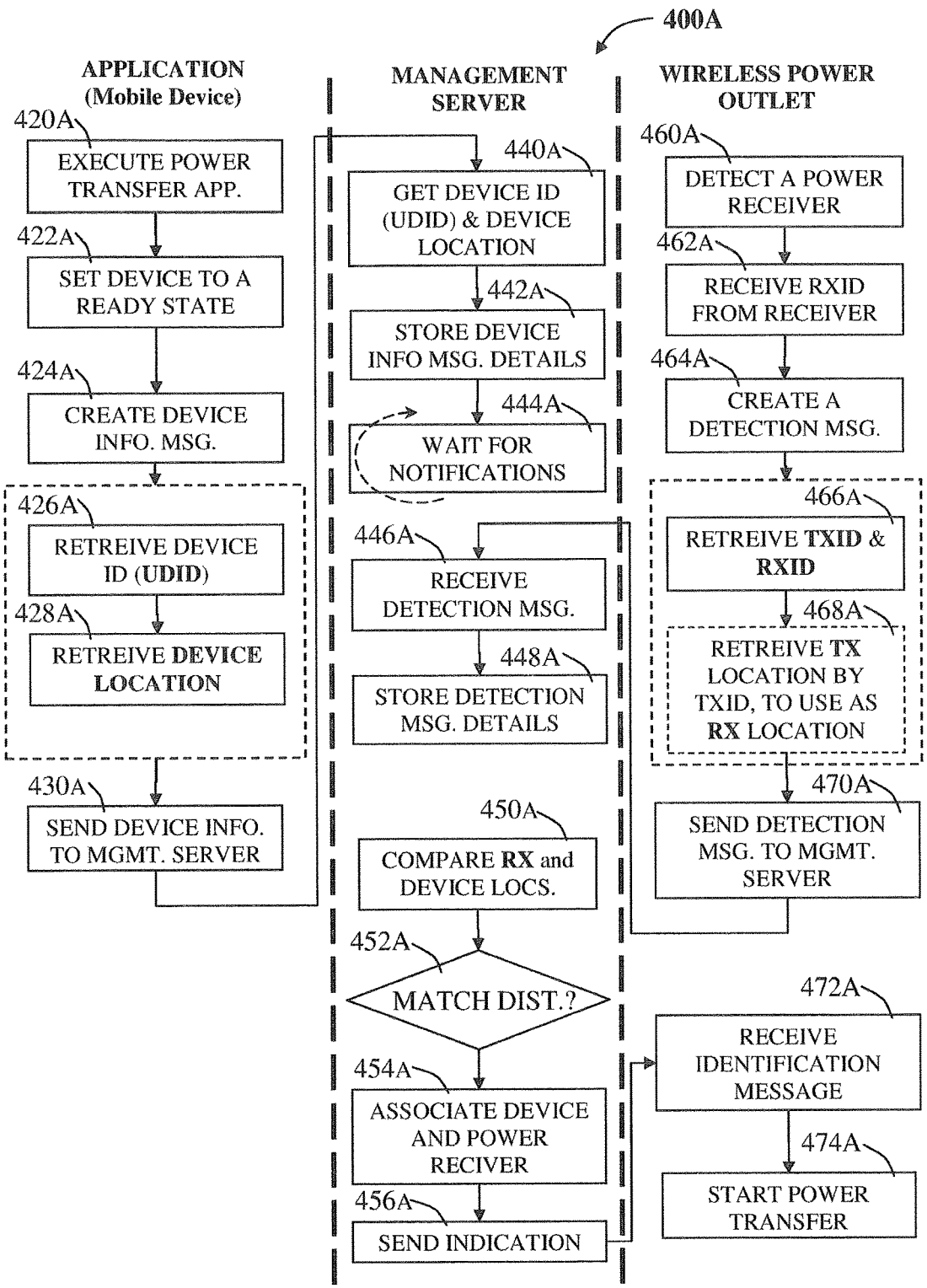
FIG. 4A is a flowchart representing selected actions of a possible location based method for an activation sequence for a user of a communication device to receive power transfer from a wireless power outlet.

Reference is now made to the flowchart of FIG. 4A representing selected actions of a possible location based method 400A for processing a software activation sequence enabling a user of a communication device to receive power transfer from a wireless power outlet.

The method is described spanning three nodes of a distributed system architecture, based upon a centrally managed server controlling wireless power transfer between wireless power outlets and wireless power receivers associated with communication devices, as described in FIGS. 1A-C.

The method is directed to a management server for associating a wireless power receiver with a communication device. The wireless power receiver is configured and operable to receive power from a wireless power outlet, and to provide power to the communication device. The wireless power receiver may be connected to the communication device such that, via the wireless power receiver, the communication device may draw power from the wireless power outlet. For example wireless power receivers may include retrofittable elements such as rings, cases, skins, replacement backcovers, wireless power enabled power packs and the like.

To facilitate unique identification of the elements, the communication device may be labeled with a communication device identification code (UDID), the wireless power receiver may be labeled with a wireless power receiver identification code (RXID), and the wireless power outlet may be labeled with a wireless power outlet identification code (TXID).

The wireless power receiver is further configured and operable to communicate with the wireless power outlet via a close communication channel using a protocol such as Bluetooth, Bluetooth Low Energy, WiFi, Zigbee or Near Field Communication (NFC). Alternatively or additionally, close communication may be enabled using optical signals, audio signal, and ultrasound or data-over-coil communication in parallel with power transfer. Still other communication channels will occur to those skilled in the art.

The method may include executing a wireless power transfer application on a mobile device—step 420A, setting the device to a ready state for activation—step 422A, and creating a communication device information message for sending to the management server—step 424A. For example a communication device information message may be compiled by retrieving the communication device identification code (UDID)—step 426A; and the communication device location, for example using an internal location system, such a satellite positioning system, a cellular triangulation system or the like —step 428A. The communication device information message may then be sent to the central management server—step 430A.

The method on the management server side may start by receiving the first message from the communication device—step 440A, including, at least the communication device UDID and data pertaining to its location. These details associated with the communication device may be stored—step 442A; and the management may wait for further notifications—step 444A;

The method on the wireless power outlet side may include detecting a wireless power receiver—step 460A and receiving therefrom an RXID—step 462A. Accordingly a detection message may be created for sending to the management server—step 464A. For example the detection message may be compiled by retrieving the TXID identification associated with the wireless power outlet, and the RXID identification associated with the wireless power receiver—step 466A. Optionally, the wireless power outlet location may be obtained and sent to the management server, either using an outlet's location system or by using its TXID identification value to determine the wireless power receiver location —step 468A. The detection message may then be sent to the central management server.

The method on the management server side may proceed by receiving a second message of the detection details from the wireless power outlet—step 446A including the TXID and RXID. These details associated with the wireless power outlet and wireless power receiver may be stored—step 448A. Then, the management server is operable to compare the device location as obtained from the first message with the outlet location associated with the TXID as obtained from the second message—step 450A. Accordingly, if the communication device location matches or is close to the outlet location—step 452A, the communication device having the UDID may be associated with the wireless power receiver having said RXID—step 454A.

An indication may then be sent for example to the wireless power outlet allowing power transfer to commence—step 456A. The method on the wireless power outlet may then proceed with receiving the identification message—step 472A; and may start the wireless power transfer to the power receiver—step 474A.

Where required further notifications may be sent for example to the communication device, to a venue manager or the like informing of the association between the device and the wireless power receiver or wireless power outlet as appropriate.

Figure 4B:
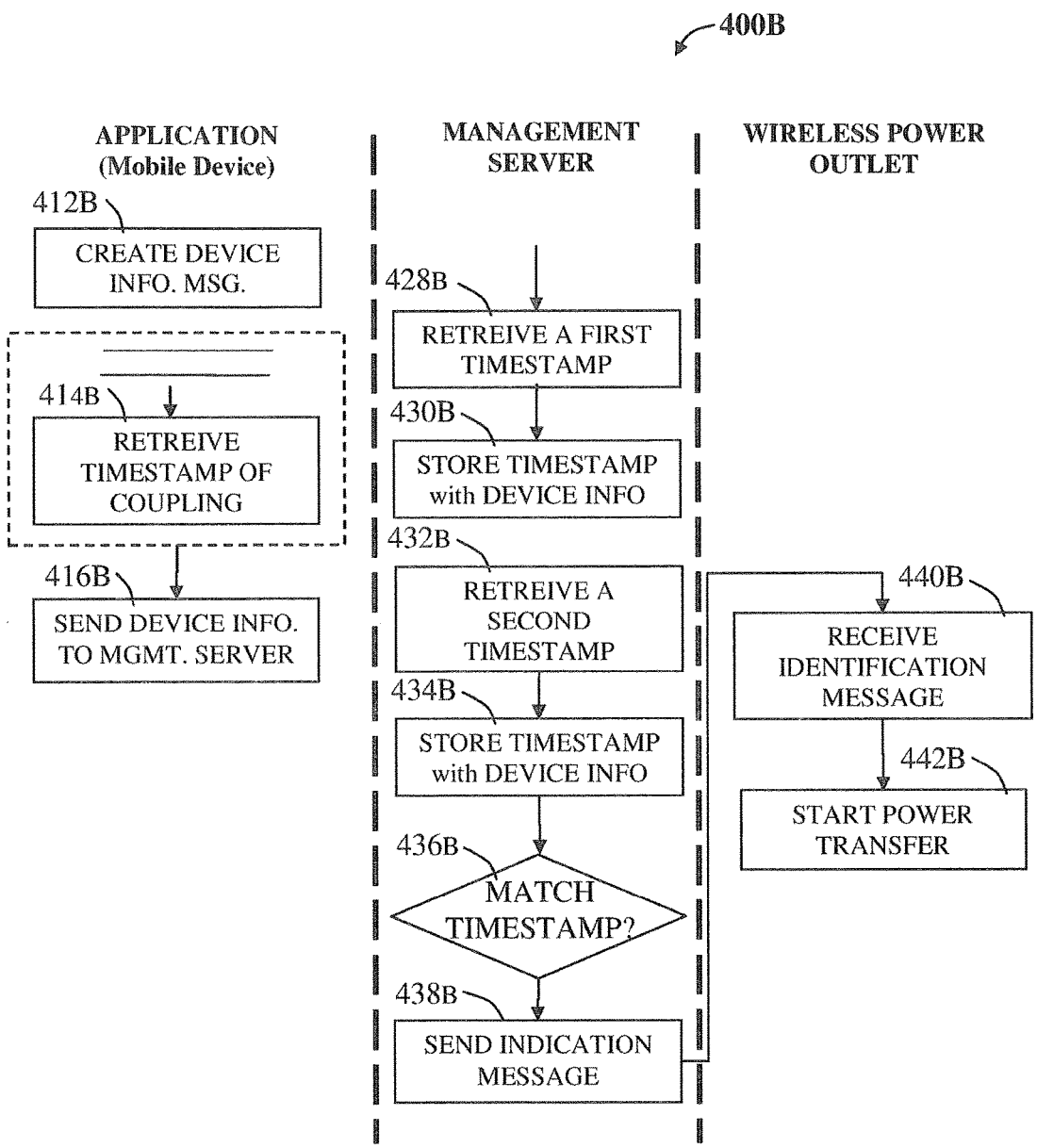
FIG. 4B is a flowchart representing selected actions of a possible location based method for an activation sequence, based upon comparing a first and second timestamp for a user.

Reference is now made to the flowchart of FIG. 4B representing selected actions illustrating a possible location based method 400B for an activation sequence, based upon comparing a first and second timestamp for a user.

The method uses the first message and a second message, as specified in FIG. 4A, where each message further includes a timestamp, indicating the time at which the wireless power receiver is coupled to the wireless power outlet, and by comparing the first time stamp with the second timestamp, the management server processor may provide an additional mechanism of associating the communication device and the wireless power receiver.

The method on the communication device may including executing a wireless power transfer application on a mobile device, setting the device to a ready state for activation and creating the communication device information message—step 412B; The communication device information message may be compiled to include the communication device identification code (UDID) and communication device location as well as a timestamp for example indicating the time at which power was received or the like—step 414B. The combined message may be sent from the communication device to the management server—step 416B, On the management server side, the first timestamp may be retrieved upon arrival of the first message—step 428B. Accordingly the first message data, including the first timestamp may be stored—step 430B. The second timestamp may be retrieved upon arrival of the second message—step 432B and the second message data, including the second timestamp may also be stored—step 434B. The first timestamp with the second timestamp may then be compared—step 436B. Where appropriate an indication message may be sent to the wireless power outlet—step 438B; and the wireless power outlet, receiving the new indication message—step 440B; may initiate power transfer from the wireless power outlet to the communication device via the wireless power receiver—step 442B.

It is particularly noted that in this method the communication device having the UDID may be associated with the wireless power receiver having the RXID only if the first timestamp matches the second timestamp. This may prevent ambiguous associations where multiple devices are located in proximity to a common outlet.

Where management server receives a plurality of UDIDs from a plurality of communication devices, the method may further require that the management server to send a message to the communication device requesting the user to reinitiate coupling of the wireless power receiver and the wireless power outlet.

It is also noted that the method may further include the management server authorizing a wireless power transfer session between the wireless power outlet and the wireless power receiver, which in turn, provides power to the communication device.

Additionally or alternatively the method may further include a management server feature of associating the wireless power transfer session with the UDID, allowing communication with the communication device in addition to providing wireless power transfer.

Figure 4C:
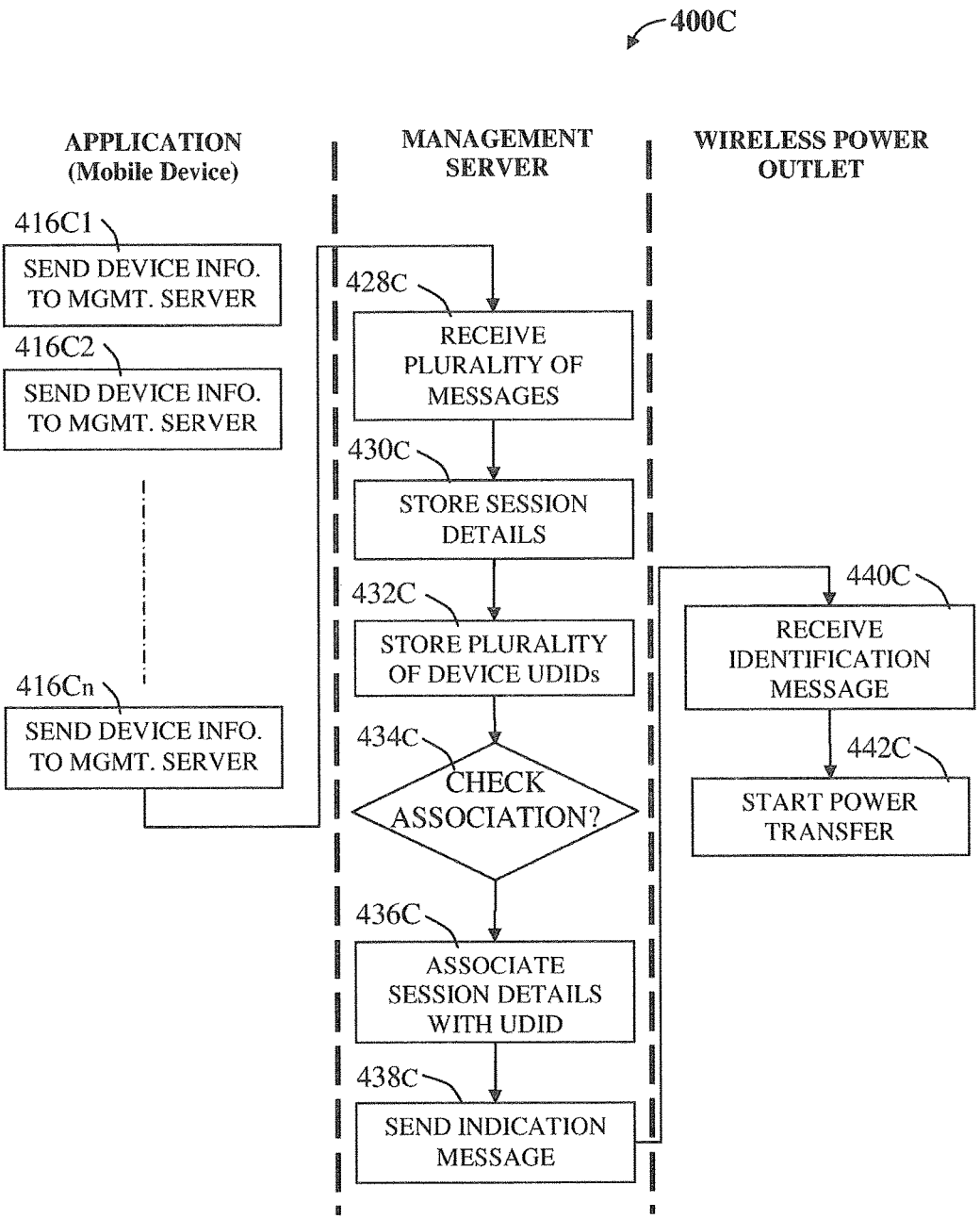
FIG. 4C is a flowchart representing selected actions of a possible location based method for processing a software activation sequence, based upon checking a plurality of association.

Reference is now made to the flowchart of FIG. 4C representing selected actions illustrating a possible location based method 400C with combined interactions with a plurality of communication devices. The method 400C may be used where the management server receives a plurality of communication messages from communication devices identified by UDID's from a plurality of communication devices.

The method may start with creating multiple communication messages from a plurality of communication devices step—416C1 through to step—416Cn; and this set of communication messages may be received on the management server side—step 428C. The session details may all be stored—step 430C; storing all of the plurality of UDIDs in a candidate set—step 432C. Subsequently, existing associations may be checked—step 434C and if one of the plurality of UDIDs is subsequently associated with the RXID then the wireless power transfer session is associated with the UDID—step 436C. Where appropriate an indication message may be sent to the wireless power outlet—step 438C; and the wireless power outlet, receiving the new indication message—step 440C; may initiate power transfer from the wireless power outlet to the communication device via the wireless power receiver—step 442C.

Technical and scientific terms used herein should have the same meaning as commonly understood by one of ordinary skill in the art to which the disclosure pertains. Nevertheless, it is expected that during the life of a patent maturing from this application many relevant systems and methods will be developed. Accordingly, the scope of the terms such as computing unit, network, display, memory, server and the like are intended to include all such new technologies a priori.

As used herein the term "about" refers to at least ±10%.

The terms "comprises", "comprising", "includes", "including", "having" and their conjugates mean "including but not limited to" and indicate that the components listed are included, but not generally to the exclusion of other components. Such terms encompass the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" may include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween. It should be understood, therefore, that the description in range format is merely for convenience and brevity and should not be construed as an inflexible limitation on the scope of the disclosure. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6 as well as non-integral intermediate values. This applies regardless of the breadth of the range.

It is appreciated that certain features of the invention, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

Although the invention has been described in conjunction with specific embodiments thereof, it is evident that other alternatives, modifications, variations and equivalents will be apparent to those skilled in the art. Accordingly, it is intended to embrace all such alternatives, modifications, variations and equivalents that fall within the spirit of the invention and the broad scope of the appended claims.

Additionally, the various embodiments set forth hereinabove are described in terms of exemplary block diagrams, flow charts and other illustrations. As will be apparent to those of ordinary skill in the art, the illustrated embodiments and their various alternatives may be implemented without confinement to the illustrated examples. For example, a block diagram and the accompanying description should not be construed as mandating a particular architecture, layout or configuration.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a computer-readable medium such as a storage medium. Processors may perform the necessary tasks.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting.

The scope of the disclosed subject matter is defined by the appended claims and includes both combinations and sub combinations of the various features described hereinabove as well as variations and modifications thereof, which would occur to persons skilled in the art upon reading the foregoing description.

The invention claimed is:

1. A method for a management server to associate a wireless power receiver with a communication device, said wireless power receiver configured and operable to communicate with a wireless power outlet, to receive power from said wireless power outlet, and to provide power to the communication device, said communication device is labeled with a device identification code (UDID), said wireless power receiver is labeled with a wireless power receiver identification code (RXID), and said wireless power outlet is labeled with a wireless power outlet identification code (TXID), the method comprising:
   receiving at least a first message from said communication device communicating at least said UDID and data pertaining to device location of said communication device;
   receiving at least a second message from said wireless power outlet communicating at least said TXID and said RXID;
   said management server comparing said device location with an outlet location associated with said TXID; and
   associating the device having said UDID with the wireless power receiver having said RXID only if said device location matches said outlet location.

2. The method of claim 1 said first message further including a first timestamp indicating the time at which said wireless power receiver is coupled to said wireless power outlet, and said second message further including a second timestamp indicating the time at which said wireless power receiver is coupled to said wireless power outlet.

3. The method of claim 2 further comprising:
   associating the device having said UDID with the wireless power receiver having said RXID only if said first timestamp matches said second timestamp.

4. The method of claim 1 further comprising:
   said management server sending a message to said communication device prompting a user to confirm device location.

5. The method of claim 1 wherein said management server receives a plurality of UDIDs from a plurality of communication devices, said method further comprising:
   said management server sending a message to said communication device requesting a user to reinitiate coupling of said wireless power receiver and said wireless power outlet.

6. The method of claim 1 wherein said receiving said at least a second message from said wireless power outlet comprises said management server receiving said second message via a communication gateway.

7. The method of claim 1 further comprising:
   said management server authorizing a wireless power transfer session between said wireless power outlet and said wireless power receiver.

8. The method of claim 7 further comprising said management server associating said wireless power transfer session with said UDID.

9. The method of claim 7 wherein said management server receives a plurality of UDIDs from a plurality of communication devices, said method further comprising:
   saving details of said wireless power transfer session;
   storing all of said plurality of UDIDs in a candidate set; and
   if one of said plurality of UDIDs is subsequently associated with said RXID then associating said wireless power transfer session with the UDID associated therewith.

10. A method for a communication device configured to receive power transfer via a wireless power receiver conductively connected thereto, said communication device labeled with a device identification code (UDID) operable to activate wireless power transfer from a wireless power outlet labeled with a wireless power outlet identification code (TXID) to said wireless power receiver labeled with a wireless power receiver identification code (RXID), said method comprising:
   executing a power transfer software application on said communication device;
   said power transfer software application accessing location data of said communication device;
   said power transfer software application sending at least a first message to a management server communicating at least said UDID and data pertaining to device location of said communication device; and
   said wireless power receiver communicating said RXID to said wireless power outlet such that wireless power outlet sends at least a second message communicating said TXID and said RXID to said management server.

11. The method of claim 10, wherein said step of executing said power transfer software application comprises:
   downloading said power transfer software application to said communication device;
   installing said power transfer software application onto said communication device; and
   configuring said power transfer software application to communicate with said management server.

12. The method of claim 10, wherein said step of said power transfer software application accessing location data of said communication device, further comprises:
   receiving, via said power transfer software application, an instruction to enable location services.

13. The method of claim 10, wherein said step of said power transfer software application accessing location data of said communication device, further comprises:

receiving, via said power transfer software application, an instruction to bring said communication device into range of said wireless power outlet.

14. The method of claim 10, wherein said wireless power receiver is selected from a group consisting of ring devices, cases, skins, backcovers, embedded devices and wirelessly enabled batteries.

15. The method of claim 10, wherein said location data is determined by said power transfer software application by accessing satellite positioning data values of said communication device.

16. The method of claim 10, said first message further comprising a first timestamp indicating the time at which said wireless power receiver is coupled to said wireless power.

17. The method of claim 10, said second message further comprising a second timestamp indicating the time at which said wireless power receiver is coupled to said wireless power.

* * * * *